United States Patent [19]

Matsumoto et al.

[11] Patent Number: 4,961,342

[45] Date of Patent: * Oct. 9, 1990

[54] APPARATUS FOR DETECTING THROTTLE VALVE OPENING OF ENGINE

[75] Inventors: Osamu Matsumoto; Mamoru Sumida; Teruhiko Moriguchi, all of Hyogo, Japan

[73] Assignee: Mitsubishi Denki Kabushiki Kaisha, Tokyo, Japan

[ * ] Notice: The portion of the term of this patent subsequent to Sep. 19, 2006 has been disclaimed.

[21] Appl. No.: 359,300

[22] Filed: May 31, 1989

Related U.S. Application Data

[63] Continuation of Ser. No. 138,401, Dec. 28, 1987, Pat. No. 4,866,981.

[30] Foreign Application Priority Data

Dec. 26, 1986 [JP] Japan ............................ 61-203253
Dec. 26, 1986 [JP] Japan ............................ 61-203254
Dec. 26, 1986 [JP] Japan ............................ 61-203255

[51] Int. Cl.⁵ ............................................ G01M 19/00
[52] U.S. Cl. ............................................... 73/118.1
[58] Field of Search ............... 73/118.1; 464/137, 180; 403/335, 375, 354

[56] References Cited

U.S. PATENT DOCUMENTS 2,439,479 4/1948 Mackmann .
2,720,765 10/1955 Drexler .
4,392,375 7/1983 Eguchi et al. .
4,547,177 10/1985 Ueno .
4,688,420 8/1987 Minagawa .

Primary Examiner—Robert R. Raevis
Attorney, Agent, or Firm—Sughrue, Mion, Zinn, Macpeak & Seas

[57] ABSTRACT

An apparatus for detecting the opening of the throttle valve of an internal combustion engine. The apparatus comprises a throttle body constituting a portion of a suction passage, a valve shaft held to the throttle body, a throttle valve for controlling the flow of air inside the suction passage, and a sensor fixed to the throttle body. The sensor has a driving shaft one end of which is disposed outside the case of the sensor. A U-shaped engaging member having two legs is fixed to this one end of the driving shaft. A disklike engaging member having two grooves is fixed to one end of the valve shaft. The two legs are fitted in the two grooves.

3 Claims, 3 Drawing Sheets

FIG. 3
FIG. 4(a)  FIG. 4(b)
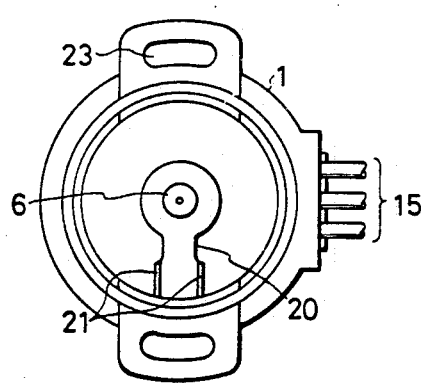
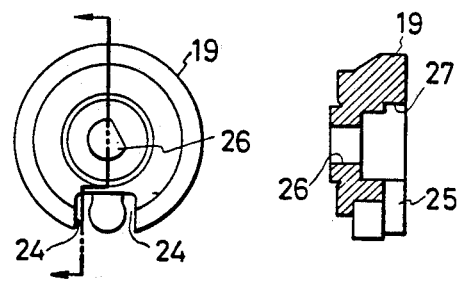
FIG. 5
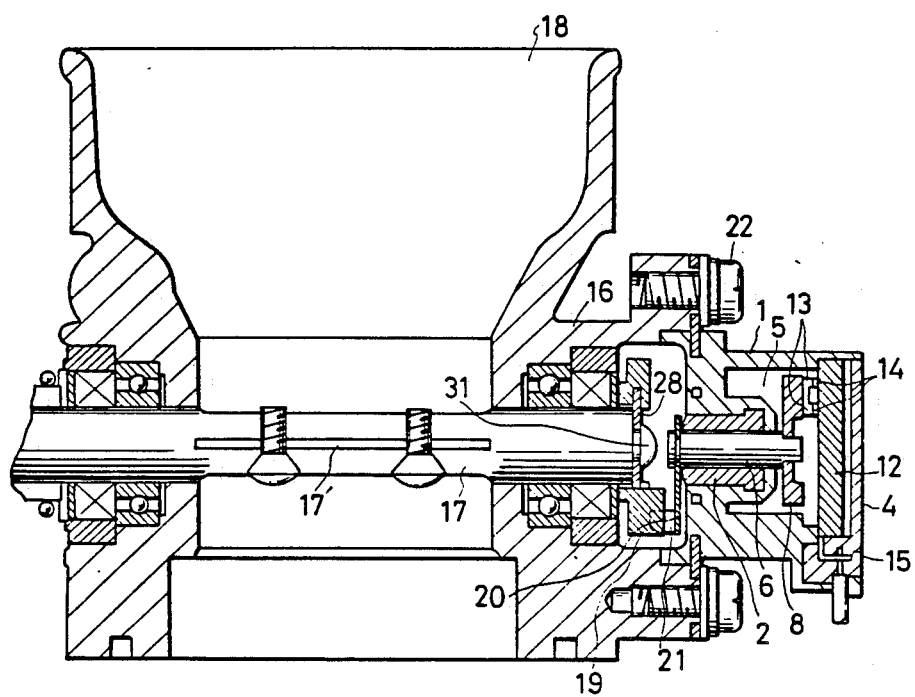

APPARATUS FOR DETECTING THROTTLE VALVE OPENING OF ENGINE

This is a continuation of application Ser. No. 138,401, filed Dec. 28, 1987; now U.S. Pat. No. 4,866,981, issued Sep. 19, 1989.

BACKGROUND OF THE INVENTION

The present invention relates to an apparatus for detecting the opening of the throttle valve of an internal combustion engine.

An engine equipped with an electronic fuel injection device determines the amount of fuel injected while measuring the amount of air flowing into the engine, in order to obtain a desired air-fuel ratio.

In some engines, an airflow meter is installed in the suction passage to directly measure the amount of air sucked in. In other engines, the amount of air that is sucked in is determined from the opening of the throttle valve or the negative pressure due to suction and from the engine speed. Of the latter type, the engine which determines the engine load by detecting the opening of the throttle valve interlocking with the accelerator pedal has the advantage that it is simple in structure.

Some of the engines equipped with airflow meters are designed to detect the opening of the throttle valve for various purposes.

FIG. 1 shows a sensor for detecting the opening of a throttle valve, the sensor being disclosed in Japanese Utility Model Laid-Open No. 70104/1983, for example. This sensor comprises a case 1, a guide member 2, a connector 3, a cover 4, a potentiometer chamber 5, a driving shaft 6, a hole 7 formed along the axis of the shaft, an annular member 8, an insulating base 12 fixed to the case 1, sliders 13, a conductive sheet and a resistor sheet 14, and an output terminal 15.

The guide member 2 is fitted in a hole formed in the center of the case 1. The driving shaft 6 having the hole 7 is rotatably inserted in the guide member 2. The annular member 8 is rotatably mounted on the guide member 2, and has a protruding portion 8a. The shaft 6 has an arm 6a held in the protruding portion 8a. Thus, when the shaft 6 rotates inside the hole formed in the center of the guide member 2, the annular member 8 rotates around the guide member 2. The sliders 13 are carried on the annular member 8. The conductive sheet and the resistor sheet 14 are mounted on the insulating base 12 so as to draw an arc. Therefore, an output voltage that varies according to the angular position of the annular member 8 appears at the output terminal 15 on the principle of a potentiometer.

The sensor constructed as described above is mounted to a throttle body (not shown) to constitute an apparatus for detecting the opening of a throttle valve (not shown). A valve shaft (not shown) on which the throttle valve is carried aligns with the hole 7 in the shaft 6.

Since the conventional apparatus for detecting the throttle valve opening is constructed as described above, it is necessary to mount the case 1 to the throttle body in such a way that the valve shaft carrying the throttle valve aligns with the hole 7, otherwise the center of rotation of the driving shaft of the sensor would deviate from the axis of the throttle valve or would be inclined relative to the axis, thereby distorting the guide member 2. This would make the pressure applied to the sliders 13 by the conductive sheet and the resistor sheet 14 nonuniform. As a result, the output voltage appearing at the output terminal 15 would not be precisely in proportion to the angular position of the annular member 8. Also, vibration would be directly transmitted to the sensing section from the valve shaft, because the valve shaft is fitted in the hole 7. This would produce undesirable results.

The present invention has been made to solve the foregoing problems with the prior art apparatus. It is an object of the present invention to provide a throttle valve opening-detecting apparatus which allows the axis of the shaft of a throttle valve to deviate from the axis of the driving shaft of a sensor for detecting the throttle valve opening, and in which vibration is not easily transmitted from the valve shaft to the sensor.

OBJECTS AND SUMMARY OF THE INVENTION

In the prior art apparatus, the valve shaft of the throttle shaft is fitted in the hole 7 in the driving shaft 6 of the sensor for detecting the opening Unlike the prior art apparatus, a disklike engaging member having two grooves is fixed to one axial end of the shaft of a throttle valve. A U-shaped engaging member having two legs is attached to one axial end of the driving shaft 6 of the sensor for detecting the opening. When the sensor is mounted to a throttle body, the legs of the U-shaped engaging member are fitted into the grooves in the dislike engaging member.

In accordance with the present invention, the legs of the U-shaped engaging member are fitted in the grooves in the disklike engaging member and, therefore, rotary motion is transmitted from the shaft of the throttle valve to the driving shaft of the sensor without presenting any problem even if the axis of the shaft of the throttle valve deviates from the center of rotation of the sensor or is inclined relative to the center of rotation. In addition, this connector portion attenuates the vibration which is transmitted from the shaft of the throttle valve.

BRIEF DESCRIPTION OF THE DRAWINGS

FIG. 3 is a front elevation of the throttle valve opening-detecting sensor shown in FIG. 2;

FIG. 4(a) is a front elevation of the disklike engaging member shown in FIG. 2;

FIG. 4(b) is a cross-sectional view of the engaging member shown in FIG. 4(a);

FIG. 5 is a cross-sectional view of an apparatus for detecting the opening of a throttle valve, the apparatus being fabricated in accordance with the invention;

DETAILED DESCRIPTION OF THE PREFERRED EMBODIMENTS

Figure 1:
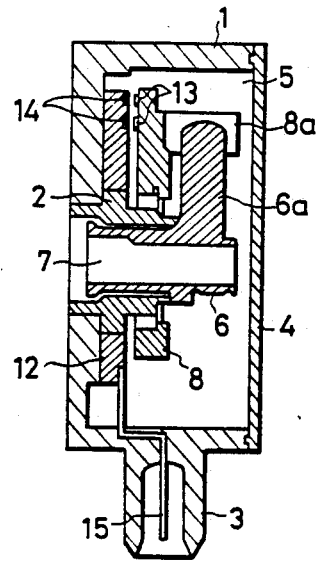
FIG. 1 is a cross-sectional view of a conventional sensor for detecting the opening of a throttle valve.
Figure 2:
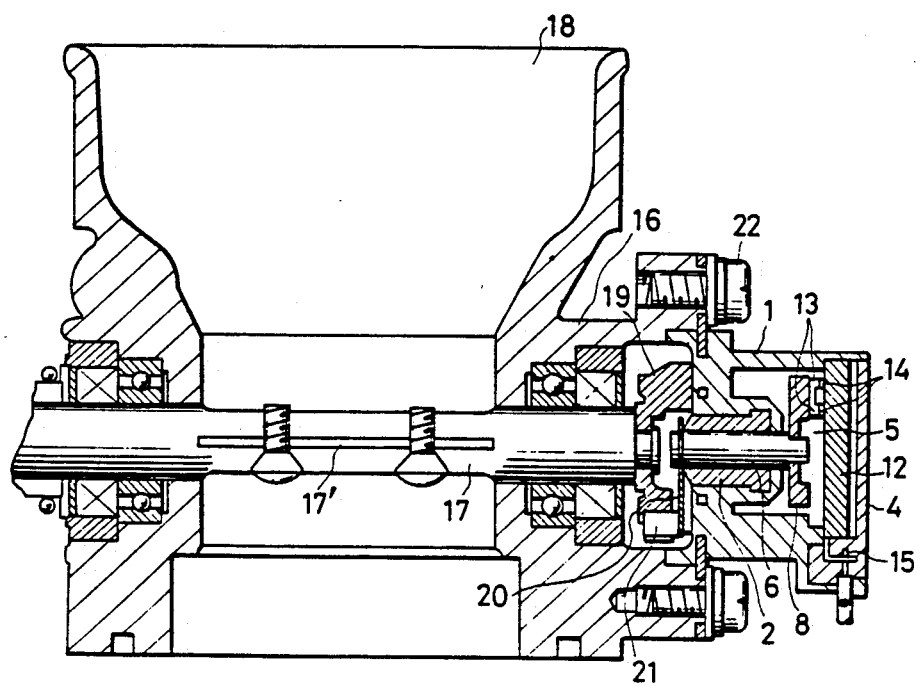
FIG. 2 is a cross-sectional view of an apparatus for detecting the opening of a throttle valve, the apparatus being fabricated in accordance with the invention.

FIG. 2 is a cross-sectional view of the first embodiment of the invention. It is to be noted that like components are denoted by like reference numerals throughout all the figures and that those components already described will not be described in detail below. The novel apparatus includes a throttle body 16, a valve shaft 17, a suction passage 18, a disklike engaging member 19 having two grooves, a U-shaped engaging member 20 having two legs 21, and screws 22 for mounting the case 1 of a sensor that detects the opening of a throttle valve to the throttle body 16.

In this novel apparatus, the driving shaft 6 which is guided by the guide member 2 in making a rotary motion is not hollow but solid. The annular member 8 carrying the sliders 13 is rigidly fixed to one end of the shaft inside the case 1. The U-shaped engaging member 20 having the two legs 21 is firmly fixed to the other end outside of the case 1. The disklike engaging member 19 having the two grooves is fixedly mounted to one end of the valve shaft 17. The two legs 21 are fitted in the grooves in the disklike engaging member 19. The case 1 is mounted to the throttle body 16 with the screws 22. When the driving shaft 6 is rotated by rotating the valve shaft 17, the sliders 13 carried on the annular member 8 move along the arc-shaped arrangement of the conductive sheet and the resistor sheet 14. An output voltage which varies according to the angular position appears at the output terminal 15 on the principle of a potentiometer.

FIG. 3 is a front elevation of the body of the throttle valve. As can be seen from this figure, in the condition shown in FIG. 2, the output terminal 15 is shown to have been rotated through 90°. The sensor is mounted on the throttle body 16 by inserting the screws 22 into arc-shaped holes 23.

FIG. 4(a) is a front elevation of the disklike engaging member 19 attached to the axial end of the valve shaft 17. FIG. 4(b) is a cross-sectional view of the engaging member 19. Two grooves 24 are formed in the outer surface of the engaging member 19, which is mounted to the axial end of the valve shaft 17 through a hole 26. The central portion of the U-shaped engaging member 20 which is on the side of the sensor extends into a large space 27 in the engaging member 19. The radial portion of the engaging member 20 is inserted in a recess 25. The two legs 21 are fitted in the grooves 24. The disklike engaging member 19 is molded out of resin. The U-shaped engaging member is fabricated by machining a metal sheet.

As described above, in the novel apparatus for detecting the throttle valve opening, the sensor is connected to the shaft of the throttle valve by bringing the two legs into engagement with the two grooves. Therefore, it is not necessary to exercise care so as not to produce misalignment when the sensor is mounted to the throttle body 16 with the screws 22, but the sensor is not affected adversely thereby. Also, vibration is not directly transmitted to the sensor from the valve shaft 17. Further, since the two legs are engaged in the two grooves, if the buried resinuous portion between the two grooves should come off, then the disklike engaging member 19 would remain on both sides of the two legs, thus maintaining the fundamental function. Also, even if one of the two legs comes off, then the remaining one will maintain the fundamental function.

FIG. 5 is a cross-sectional view of the second embodiment of the invention. It is to be noted that like components are denoted by like reference numerals throughout all the figures and that those components already described will not be described in detail below.

In this second embodiment, a metal sheet 28 buried in the resinous engaging member 19 is fixed by hitting the head 31 of a joining element for caulking the sheet 28.

Figure 6A:
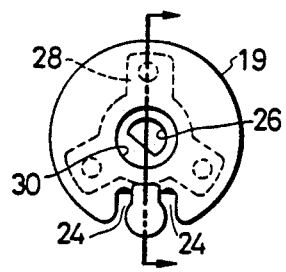
FIG. 6(a) is a front elevation of the disklike engaging member shown in FIG. 5.
Figure 6B:
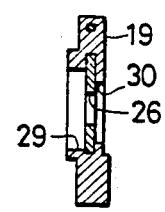
FIG. 6(b) is a cross-sectional view of the engaging member shown in FIG. 6(a)

FIG. 6(a) is a front elevation of the disklike engaging member 19 attached to the axial end of the valve shaft 17. FIG. 6(b) is a cross-sectional view of the engaging member 19. The disklike engaging member 19 is molded out of resin. Two grooves 24 are formed in the outer surface of the engaging member 19. A metal sheet 28 is buried in the disklike engaging member 19 when it is molded out of resin. The sheet 28 is centrally provided with a hole 26. After one end of the valve shaft 17 is fitted into the hole 26, the head 31 of a joining element is hit so that this element may be caulked. The engaging member 19 has a large hole 29 and a small hole 30 that allows the head to spread when it is hit. The valve shaft 17 passes through the large hole 29. The two legs 21 of the U-shaped engaging member 20 on the side of the sensor are fitted in the grooves in the engaging member 19.

As described above, the disklike engaging member 19 can be easily mounted to the axial end of the valve shaft 17 by hitting the head of the joining element, because the engaging member 19 has the metal sheet 28. The engaging member 19 with which the legs 21 of the metallic U-shaped engaging member engage is made from a resin that has self-lubricating nature. Furthermore, the disklike engaging member 19 can be thinned.

Figure 7A:
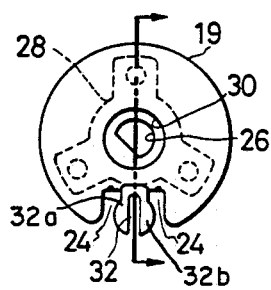
FIG. 7(a) is a front elevation of the disklike engaging member shown in FIG. 5.
Figure 7B:
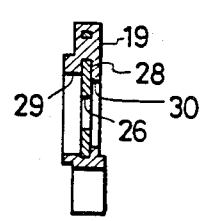
FIG. 7(b) is a cross-sectional view of the engaging member shown in FIG. 7(a).

FIG. 7 is the third embodiment of the present invention. FIG. 7(a) is a front elevation of the disklike engaging member 19 attached to the axial end of the valve shaft 17. FIG. 7(b) is a cross-sectional view of the engaging member 19. The disklike engaging member 19 is molded out of resin. Two grooves 24 are formed in the outer surface of the engaging member 19. A slit 32 is formed between the two grooves. A metal sheet 28 is buried in the disklike engaging member 19 when it is molded out of resin. The sheet 28 is centrally provided with a hole 26. After one end of the valve shaft 17 is fitted into the hole 26, the head 31 of a joining element is hit so that this element may be caulked. The engaging member 19 has a large hole 29 and a small hole 30 that allows the head to spread when it is hit. The valve shaft 17 passes through the large hole 29. The two legs 21 of the engaging member 20 are fitted in the grooves 24. The slit 32 is formed between the two grooves. As a result, the apparatus is easy to assemble 24 such that the remaining portions 32a and 32b of the engaging member 19 resiliently engage the two legs when they are inserted into the two grooves. Furthermore, no play is created after the components are brought into engagement with each other. Further, the provision of the slit 32 does not produce any play after the apparatus is assembled, even if it is manufactured to less close tolerances. Additionally, the slit makes it easy to assemble the apparatus.

What is claimed is:

1. An apparatus for detecting the opening of the throttle valve of an engine, said apparatus comprising:
   a throttle body constituting a portion of a suction passage;
   a valve shaft extending through the suction passage and mounted on the throttle body;
   a throttle valve held to the valve shaft and acting to control the amount of air flowing through the suction passage;
   a sensor for detecting the opening of the throttle valve, the sensor having a driving shaft whose one end is disposed coaxially with one end on the valve shaft, the sensor being fixed to the throttle body to produce an output corresponding to the angular position of the driving shaft; and an engaging means for bringing corresponding parts of the shafts into engagement with each other, said engaging means consisting of a first engaging member fixed to one of said shafts and a second engaging member fixed to the other shaft, wherein said first engaging member has two grooves and a cylindrical portion provided between said two grooves, and said second engaging member is a U-shaped engaging member having two legs fitted in said two grooves in such a manner that said cylindrical portion is pinched by said two legs.

2. An apparatus according to claim 1, wherein said two legs are not in contact with an outer internal surface of said grooves, respectively, but said two legs are in contact with said cylindrical portion.

3. An apparatus according to claim 1, wherein side portions of said cylindrical portion are lineally contacted by said two legs.

* * * * *